US006779051B1

(12) United States Patent
Basil et al.

(10) Patent No.: US 6,779,051 B1
(45) Date of Patent: Aug. 17, 2004

(54) DETERMINING AN END POINT OF A GRE TUNNEL

(75) Inventors: Nipun Basil, Billerica, MA (US); Ayikudy Srikanth, Reading, MA (US); Tom Meehan, Billerica, MA (US)

(73) Assignee: Nortel Networks Corporation, Montreal (CA)

(*) Notice: Subject to any disclaimer, the term of this patent is extended or adjusted under 35 U.S.C. 154(b) by 0 days.

(21) Appl. No.: 09/364,339

(22) Filed: Jul. 30, 1999

(Under 37 CFR 1.47)

(51) Int. Cl.[7] ............... G06F 13/00; G06F 15/173; H04L 12/28
(52) U.S. Cl. ............... 710/33; 710/26; 370/401; 709/242; 709/238
(58) Field of Search ............... 709/242, 236, 709/238, 245, 246; 704/228; 370/401; 713/201; 710/19, 4, 20, 21, 26, 33, 34, 105, 106

(56) References Cited

U.S. PATENT DOCUMENTS 5,430,727 A * 7/1995 Callon ............... 370/85.13
6,061,650 A * 5/2000 Malkin et al. ............... 704/228
6,065,061 A * 5/2000 Blahut et al. ............... 709/239
6,151,628 A * 11/2000 Xu et al. ............... 709/225

OTHER PUBLICATIONS

"RFC 2332: NBMA Next Hop Resolution Protocol (NHRP)" by J. Luciani, D. Katz, D. Piscitello, B. Cole, and N. Doraswamy (Apr. 1998).

"Generic Routing Encapsulation (GRE)," S. Hanks et al., Oct. 1994.

"Generic Routing Encapsulation Over IPV4 Networks," S. Hanks et al., Oct. 1994.

* cited by examiner

Primary Examiner—Tim Vo
(74) Attorney, Agent, or Firm—Fish & Richardson P.C.

(57) ABSTRACT

An end point address of a generic routing encapsulation (GRE) tunnel is obtained by forwarding a data packet through the GRE tunnel to devices at a multicast address. The data packet includes a logical address of a GRE tunnel end point device. A reply to the data packet is received from a remote GRE tunnel end point device. The reply includes a physical address of the remote GRE tunnel end point device.

18 Claims, 9 Drawing Sheets

DETERMINING AN END POINT OF A GRE TUNNEL

BACKGROUND OF THE INVENTION

This invention relates to determining an end point of a generic routing encapsulation ("GRE") tunnel.

GRE is a protocol that enables the encapsulation of an arbitrary network layer protocol (the payload protocol) by another arbitrary network layer protocol (the delivery protocol). GRE tunnels are virtual tunnels that are created on an intermediary network and that are used to transmit GRE-encapsulated data packets from a first network to a second network. GRE tunnels are often used to create a virtual private network ("VPN") by connecting two remote local area networks ("LAN") via the Internet.

At one end of a GRE tunnel, a router receives a payload packet from the first network, and encapsulates the payload packet so that it conforms to the delivery protocol of the intermediary network. The payload packet may be encapsulated in another packet or an Ethernet frame, for example. The encapsulated packet is transmitted through the intermediary network to the other end of the GRE tunnel. At that end, a router de-encapsulates the packet, and transmits the payload packet to the second network.

Heretofore, GRE tunnels were "static", meaning that the tunnel end points had to be configured, and updated, manually. For example, an address of a router at one tunnel end point may change, thereby making it necessary to provide the new address to other routers that use the tunnel end points. In a static GRE tunnel, a network administrator, using software such as Bay Command Console ("BCC") or Site Manager, enters this new information into each end point router manually. Manual reconfiguration is time-consuming and inefficient.

SUMMARY OF THE INVENTION

In one aspect, the invention determines an end point of a GRE tunnel (e.g., an address of an end point device) by receiving a data packet at the device, identifying the data packet as a GRE packet, and determining an address of the end point of the GRE tunnel using the data packet. The address of the end point is stored in a table on the device. By determining an end point address using a GRE packet, the invention is able to provide routing updates automatically.

This aspect may include one or more of the following features and/or functions. Identifying comprises searching a header of the data packet for a value indicative of a GRE packet. The address of the end point comprises a logical address of the end point. The device is a router, and the data packet is a routing update packet.

Another aspect of the invention is directed to obtaining an end point address of a GRE tunnel dynamically. In this aspect, a data packet is forwarded through the GRE tunnel to a remote GRE tunnel end point device. In response, a reply is received from the remote GRE tunnel end point device, which includes a physical address of the remote GRE tunnel end point device.

This aspect provides a way for one device to obtain a physical address of a device at a remote tunnel end point. Thus, if end points have been added to, or removed from, the GRE tunnel, the invention can determine this dynamically and route packets accordingly.

The foregoing aspect may include one or more of the following features and/or functions.

The aspect of the invention may be performed by a local GRE tunnel end point device, and a table on the local GRE tunnel end point device may be updated to include the physical address of the remote GRE tunnel end point device. The reply includes a unicast address of the remote GRE tunnel end point device. The data packet comprises an address resolution protocol packet (ARP), and the ARP packet includes a logical address of the remote GRE tunnel end point device. The reply comprises a GRE-encapsulated data packet with the physical address of the remote GRE tunnel end point device as a payload.

This summary has been provided so that the nature of the invention can be understood quickly. A detailed description of illustrative embodiments of the invention is set forth below.

DESCRIPTION OF THE PREFERRED EMBODIMENT

Figure 1:
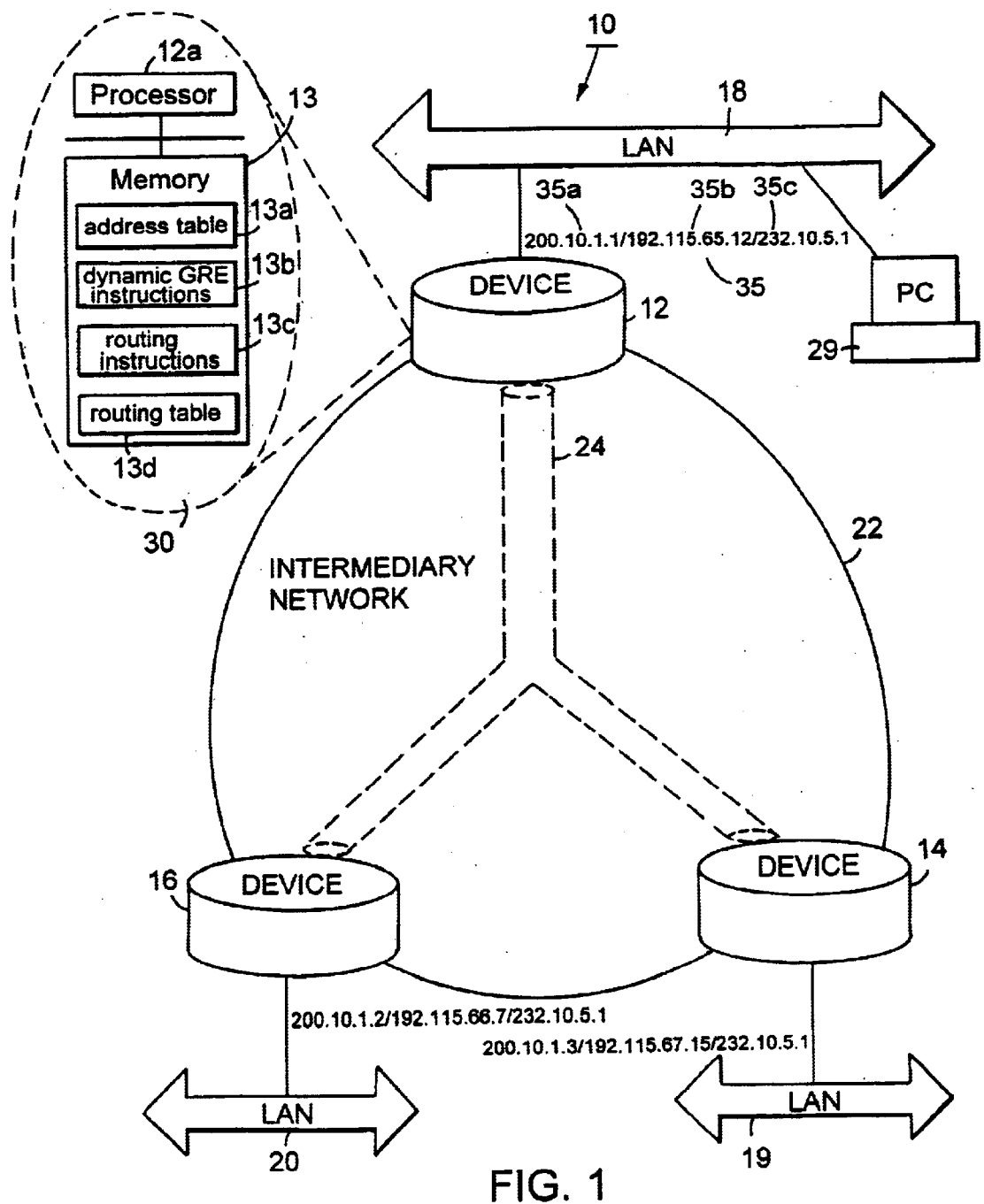
FIG. 1 shows a network system that includes three end point devices of a GRE tunnel.

Referring to FIG. 1, a network system 10 is shown which includes devices 12, 14 and 16, local area networks ("LANs") 18 to 20, and intermediary network 22.

Intermediary network 22 may be any type of network, such as a wide area network ("WAN") or the Internet, that supports IPv4 (Internet Protocol version 4), IP multicast routing, and IGMP (Internet Group Multicast Protocol). Examples of protocols that may be used to perform multicast routing are DVMRP (Distance Vector Multicast Routing Protocol), MOSPF (Multicast Open Shortest-Path First), and PIM (Protocol Independent Multicasting). Packets may also be "unicast" over intermediary network 22. Routes are distributed using protocols, such as RIP (Routing Information Protocol), OSPF (Open Shortest-Path First), and BGP (Border Gateway Protocol).

Included on intermediary network 22 is GRE tunnel 24. Intermediary network 22 has no knowledge, per se, of GRE tunnel 24. The GRE tunnel is known only to the devices at its end points, namely devices 12, 14 and 16. GRE tunnel 24 passes encapsulated data packets between devices at tunnel end points 12, 14 and 16. Encapsulated packets may be sent to single, or multiple, tunnel end point devices.

Devices 12, 14 and 16 are coupled to corresponding LANs 18 to 20. Each of LANs 18 to 20 supports IPv4 and one or more of the foregoing routing protocols for transmitting data packets between devices on the LAN (e.g., personal computer {"PC"} 29) and a GRE tunnel end point. Since both LANs 18 to 20 and intermediary network 22 support IP, GRE encapsulation (described below) will be IP over IP.

Each tunnel has a multicast address. Each tunnel end point device a physical IP address and a logical IP address. The logical IP address is an IP address that is statically configured over a GRE tunnel end point device. The physical IP address is the network (IP) address of the end point device and is used by the delivery protocol to deliver data packets through GRE tunnels to remote devices.

Devices 12, 14 and 16 are routers, or other computing devices, which receive data packets (either from a GRE tunnel or a LAN) and which forward the data packets to their intended destinations (either via a GRE tunnel or on the LAN). For example, "local" device 12 receives payload data packets from PC 29 on LAN 18 and forwards those packets to "remote" device 14 via GRE tunnel 24. Similarly, device 12 receives packets from GRE tunnel 24 and forwards those packets onto LAN 18. Whether a device is local or remote is a matter of perspective only. For example, to device 14, devices 12 and 16 are remote.

Each device 12, 14 and 16 includes a memory 13 for storing computer instructions, and a processor 12a for executing those instructions to perform various functions, as shown in blown-up view 30. For example, routing instructions 13c cause device 12 to forward routing packets in accordance with one or more of the routing protocols noted above. Dynamic GRE instructions 13b process GRE-encapsulated routing packets transmitted over GRE tunnel 24.

Memory 13 also stores an address table 13a and a routing table 13d. In this regard, each device has several associated addresses. For example, device 12 has an address 35 which includes a logical IP address 35a of "200.10.1.1", and a physical IP address 35b of "192.115.65.12". The multicast address 35c ("232.10.5.1") of GRE tunnel 24 is also shown, as are addresses of devices 14 and 16.

Routing table 13d stores network routing information, including the logical IP addresses of devices 12, 14, and 16. Routing table 13d is used by routing instructions 13c to route packets. Address table 13a stores the physical IP addresses of devices 12, 14 and 16 which map to corresponding logical IP addresses in routing table 13d.

If address table 13a needs to be updated with the physical IP address of devices 14 or 16, or if a logical/physical IP address mapping of device 12 needs to be updated in devices 14 and 16, dynamic GRE instructions 13b are executed. Dynamic GRE instructions 13b perform encapsulation and de-encapsulation, as described below. For broadcast and multicast packets, the destination IP address for such packets is a multicast address. For unicast packets, the destination address is a unicast address.

Determining a Device Logical Address

Figure 2:
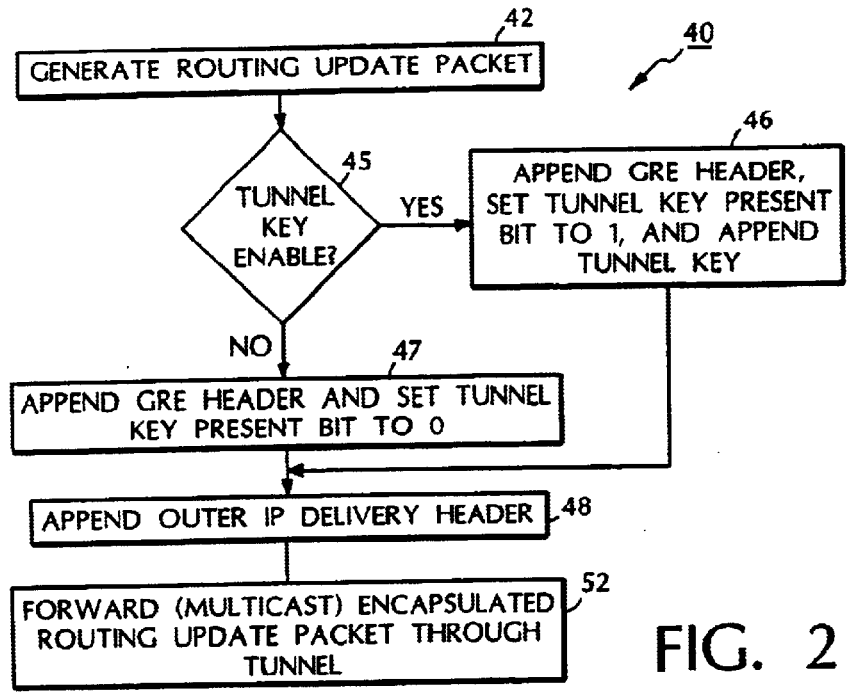
FIG. 2 is a flowchart showing a process executed at an end point device of the GRE tunnel to update routing information in other end point devices.

Referring to FIG. 2, a process 40, implemented by computer instructions, is shown for updating routing tables in remote GRE tunnel end point devices. For illustration's sake, device 14 is designated as the local GRE tunnel end point device which executes computer instructions to implement process 40.

Figure 3:
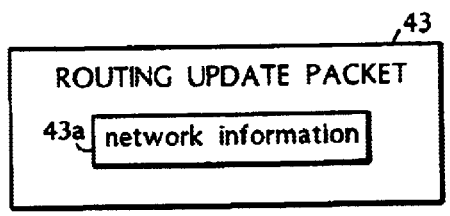
FIG. 3 shows a routing update packet.

Process 40 generates 42 a "routing update" packet 43 which holds network information 43a, including routing information such as the logical IP address of device 14 (see FIG. 3). Routing updates packets are multicast/broadcast packets (in the case of RIP and OSPF) or unicast packets (in the case of BGP).

Figure 4:
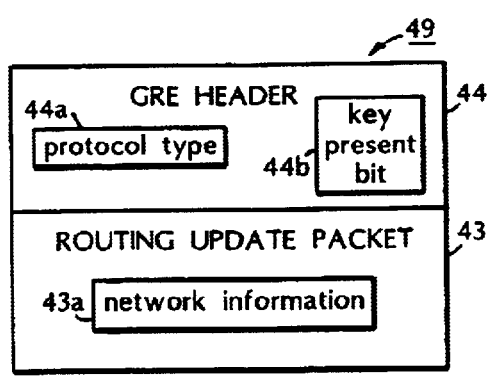
FIG. 4 shows a GRE header appended to the routing update packet.

Process 40 appends a GRE header 44 to routing update packet 43 (see FIG. 4). GRE header 44 includes a protocol type field 44a that specifies the protocol of packet 43, and a key present bit 44b that indicates if a tunnel key is enabled for the GRE tunnel.

A tunnel key is an integer from "0" to "0fffffff" in GRE header 44. It specifies a unique tunnel identifier for each GRE tunnel. If a tunnel key is enabled, all outbound traffic over a GRE tunnel will have the tunnel key in its GRE header. Inbound traffic over the GRE tunnel will be accepted only if the GRE tunnel key in the GRE header matches a tunnel key that is maintained in a memory on a tunnel end point device. Data packets that do not have the correct tunnel key are discarded.

Process 40 determines 45 whether to enable the tunnel key. If the tunnel key is enabled, process 40 appends 46 a tunnel key and a GRE header with key present bit 44b set to "1" (to indicate that the tunnel key is enabled). If the tunnel key is not enabled, process 40 appends 47 a GRE header with key present bit 44b set to "0" (to indicate that the tunnel key is not enabled). Tunnel keys need not be used in this embodiment.

Figure 5:
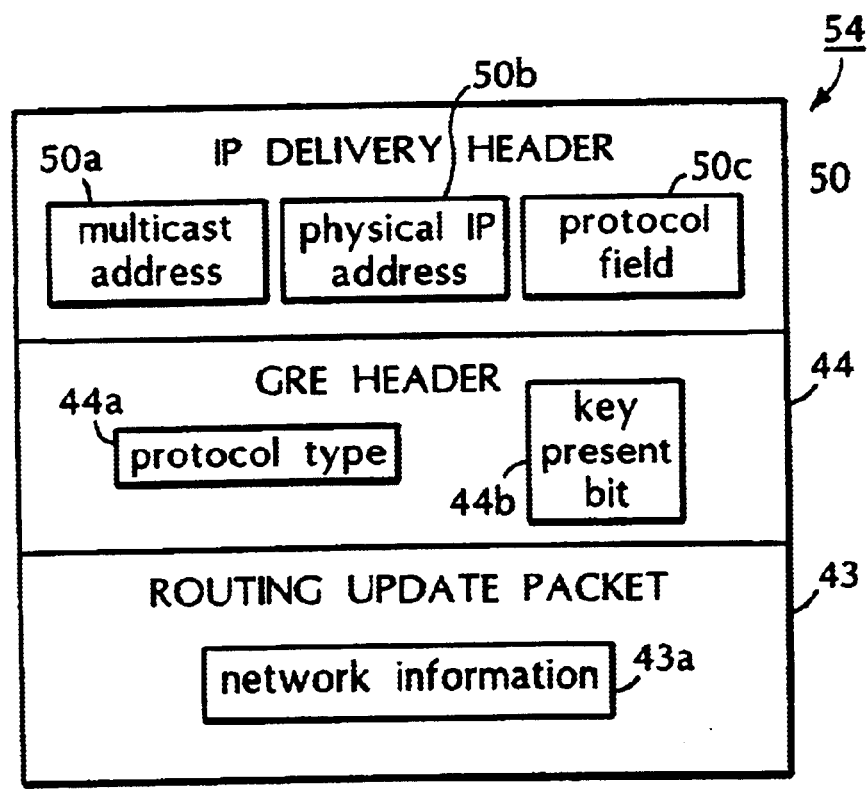
FIG. 5 shows an encapsulated routing update packet, including an outer delivery protocol header.

Process 40 appends 48 an outer IP delivery header 50 to packet 49 (see FIG. 5). IP delivery header 50 includes, as the destination address, a multicast address 50a of GRE tunnel 24. The IP delivery header includes, as the source address, the physical IP address 50b of device 14. The IP delivery header also includes a value in protocol field 50c to identify packet 54 as a GRE packet.

Process 40 forwards 52 GRE-encapsulated routing update packet 54 (FIG. 5) to multicast address 50a specified in IP delivery header 50. At each remote tunnel end point device 12 and 16, the data packet is processed.

Figure 6:
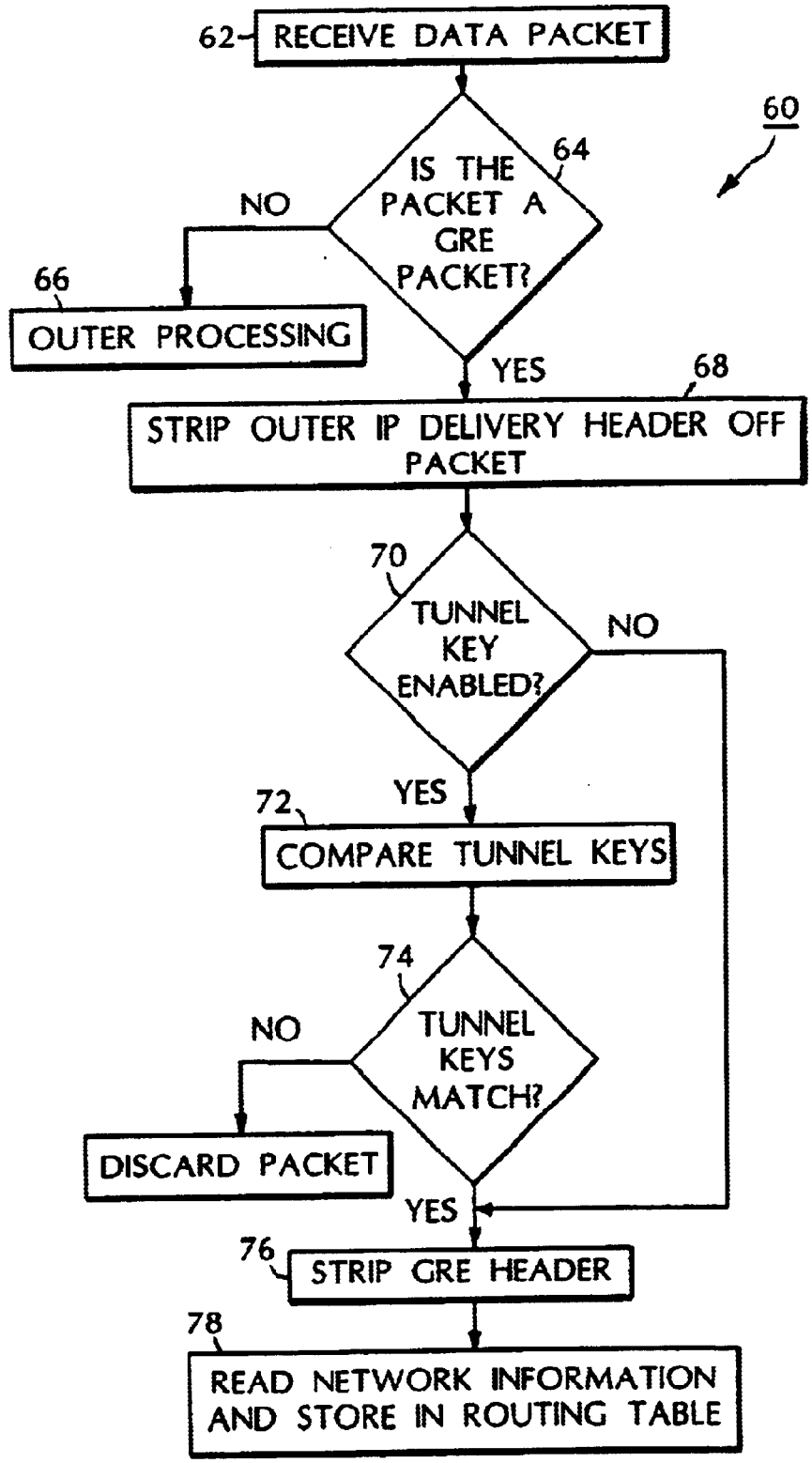
FIG. 6 is a flowchart showing a process executed at an end point device to process a routing update packet.

Referring to FIG. 6, a process 60 (in dynamic GRE instructions 13b) is executed by remote tunnel end point devices (from device 14's perspective), such as device 12, to handle routing updates received from device 14. Process 60 receives 62 the encapsulated data packet 54, determines 64 if the packet is a GRE packet (if not, the packet may be otherwise processed 66), strips 68 the outer IP delivery header 50 off of the received data packet, and determines 70 if the tunnel key is enabled based on key present bit 44b. If the tunnel key is enabled, process 60 compares 72 the tunnel key (not shown) in the packet to a tunnel key stored in its memory. If the two match 74 (or if a tunnel key was not enabled), process 60 strips 76 GRE header 44 from the packet 49, and reads 78 network information 43a from the packet. This network information 43a is stored in routing table 13d of device 12. This process enables distribution of routes that are reachable through a logical IP address of a GRE tunnel end point at device 14.

Obtaining a Device Physical Address

Figure 7:
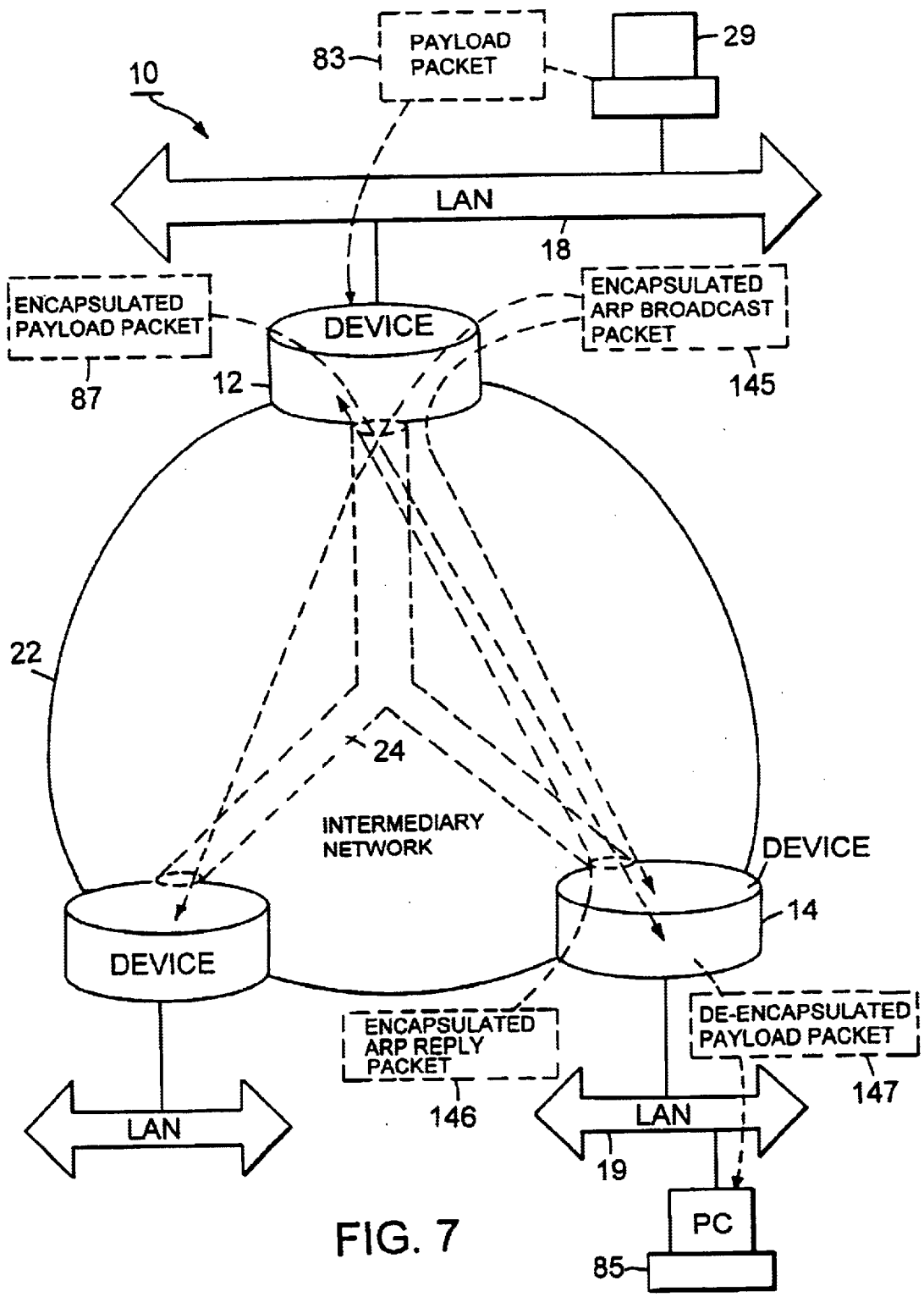
FIG. 7 is a diagram showing how packets are transmitted over the network system in one embodiment.
Figure 8:
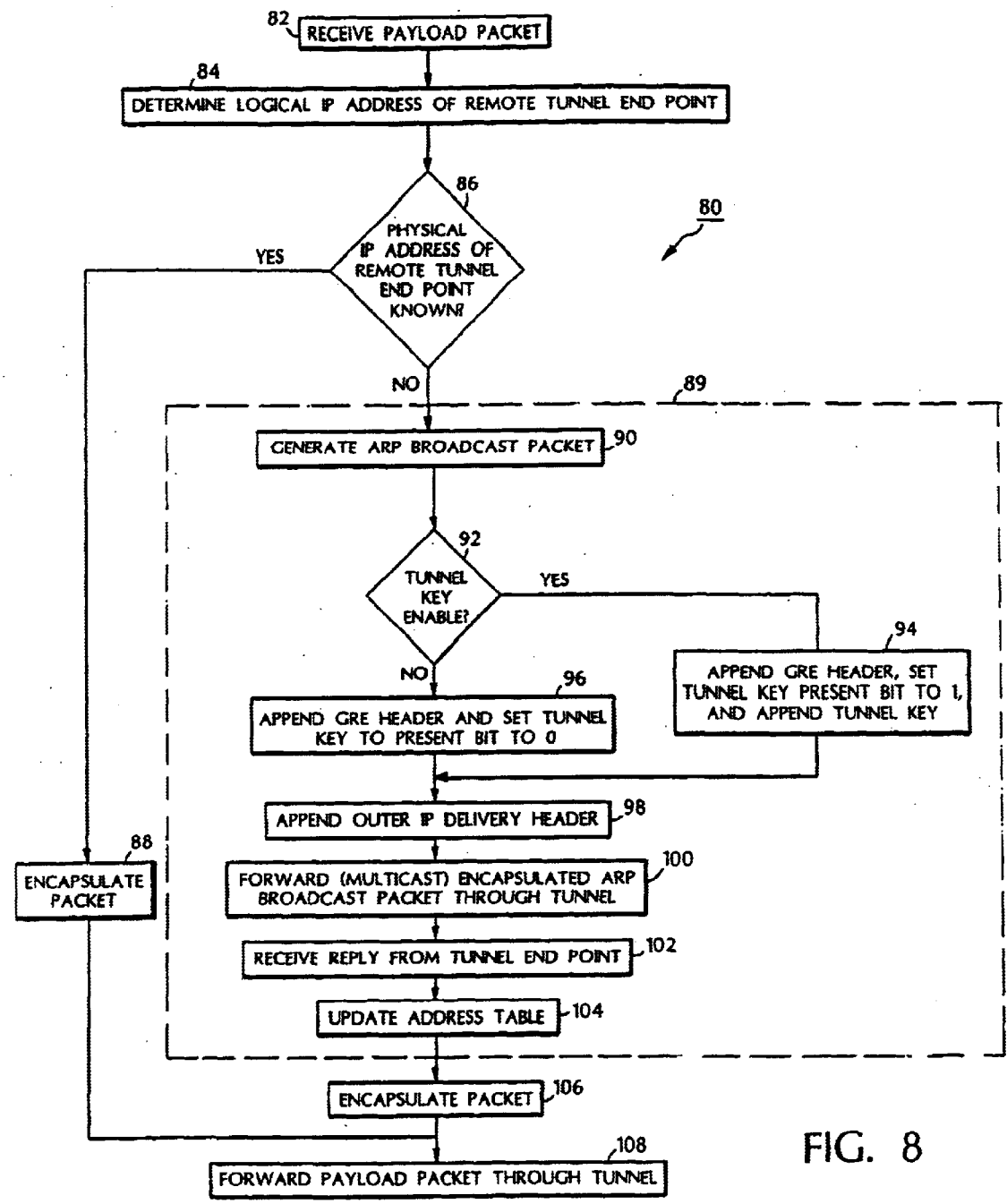
FIG. 8 is a flowchart showing a process executed at a GRE tunnel end point device to obtain a physical address of a remote end point device.

Referring to FIGS. 7 and 8, a process 80 is executed by instructions in device 12 to obtain the physical IP address of device 14. To begin, process 80 receives 82 a payload packet 83 from PC 29 on LAN 18. The payload packet is addressed to a PC 85 on remote LAN 19. Process 80 looks up a forwarding (delivery) address for PC 85 in routing table 13d. Based on the information in routing table 13d, process 80 determines that PC 85 is located at the other end of a GRE tunnel 24. Process 80 also determines the logical IP address of device 14 from routing table 13d. Process 80 determines 86 if the physical address of device 14 is known. This is done by searching through address table 13a.

If process 80 finds the physical IP address of device 14 in address table 13a, process 80 encapsulates 88 payload packet 83 (with a GRE header and outer IP delivery header) and forwards 108 encapsulated payload packet 87 through GRE tunnel 24 to device 14. If the physical IP address of device 14 is not found in address table 13a (or if device 12 has reason to believe that the address of device 14 has changed, e.g., due to network reconfiguration), process 80 determines 89 the physical IP address of device 14 dynamically.

Figure 9:
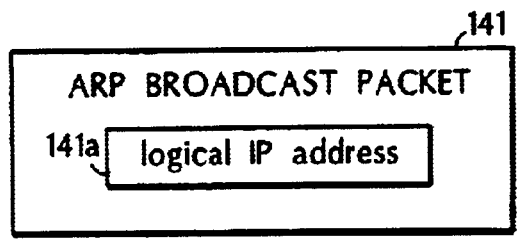
FIG. 9 shows an Address Resolution Protocol ("ARP") broadcast packet.
Figure 10:
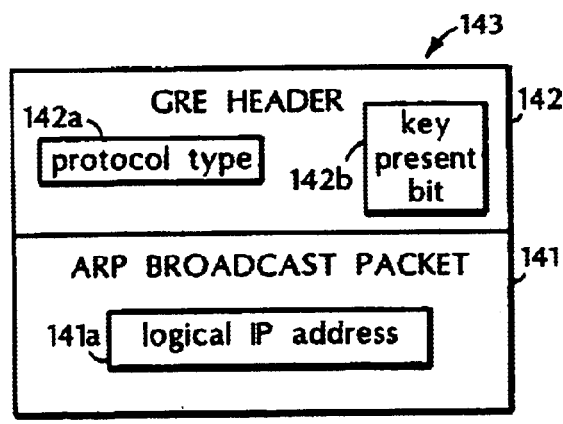
FIG. 10 shows a GRE header appended to the ARP broadcast packet.

To determine 89 the physical IP address of device 14, process 80 generates 90 an ARP broadcast packet 141 (see FIG. 9). ARP broadcast packet 141 includes the logical IP address 141a of device 14 as its payload. Process 80 encapsulates ARP broadcast packet 141 for transmission through GRE tunnel 24. Process 80 appends a GRE header 142 to ARP broadcast packet 141 (see FIG. 10). The GRE header 142 includes a protocol type field 142a that specifies the protocol of ARP broadcast packet 141. For ARP, the protocol type field is set to 0x806. GRE header 142 also includes a key present bit 142b, which indicates if a tunnel key is required for a GRE tunnel. A "0" in key present bit 142b indicates that no tunnel key is required and a "1" in key present bit 142b indicates that a tunnel key is required.

Figure 11:
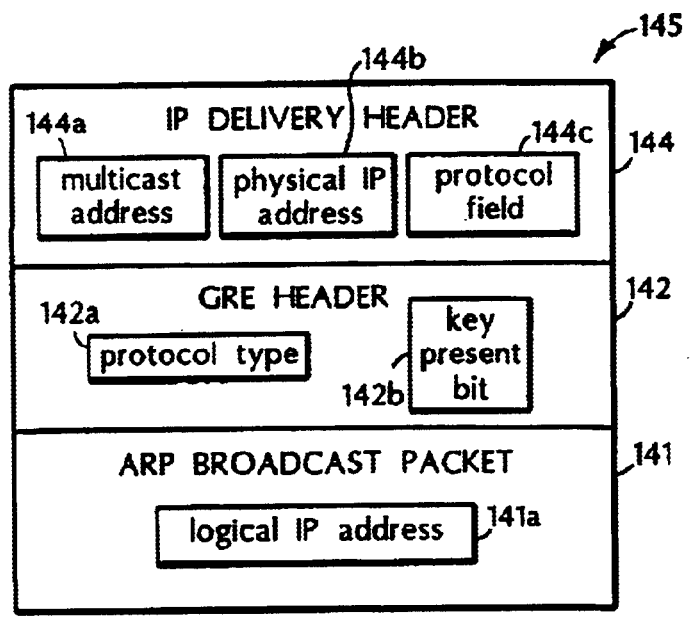
FIG. 11 shows an encapsulated ARP broadcast packet, including an outer delivery protocol header.

If the tunnel key is enabled 92, process 80 appends 94 the GRE header and tunnel key and sets key present bit 142b to "1"; otherwise it appends 96 the GRE header and sets key present bit 142b to "0". Process 80 appends 98 an outer IP delivery header 144 to packet 143 (see FIG. 11) to complete encapsulation. IP delivery header 144 includes, as the destination address, a multicast address 144a of GRE tunnel 24. IP delivery header 144 includes, as the source address, the physical IP address 144b of device 12. IP delivery header 144b also includes a value in a protocol field 144c which signifies that the packet is a GRE packet.

Process 80 forwards 100 the encapsulated ARP broadcast packet 145 (FIGS. 7 and 11) to multicast address 144a specified in IP delivery header 144. Device 14 (which is a member of the multicast group for the multicast address) receives encapsulated ARP broadcast packet 145 and processes it as described in FIG. 12 below. In response, device 14 forwards an encapsulated ARP reply packet 146 (FIG. 7) to device 12, which includes the physical IP address of device 14. Process 80 receives 102 the ARP reply packet and reads the physical IP address of device 14.

Process 80 updates 104 the address table 13a in device 12 to include the physical IP address of device 14. The physical IP address of device 14 is indexed to its logical IP address so that subsequent data packets can be forwarded by referring to the address table.

Once both the logical and physical IP addresses of device 14 are known, process 80 encapsulates 106 the payload packet 83 and forwards 108 the encapsulated payload packet 87 through GRE tunnel 24 to the physical IP address of device 14 (received in 102). Encapsulation 106 of the payload packet 83 is identical to the encapsulation process described above, except that the physical IP address of device 14 is used as the IP delivery header destination address instead of multicast address 144a. At device 14, the encapsulated packet 87 is de-encapsulated and the de-encapsulated payload packet 147 is transmitted to PC 85.

Figures 12, 12A:
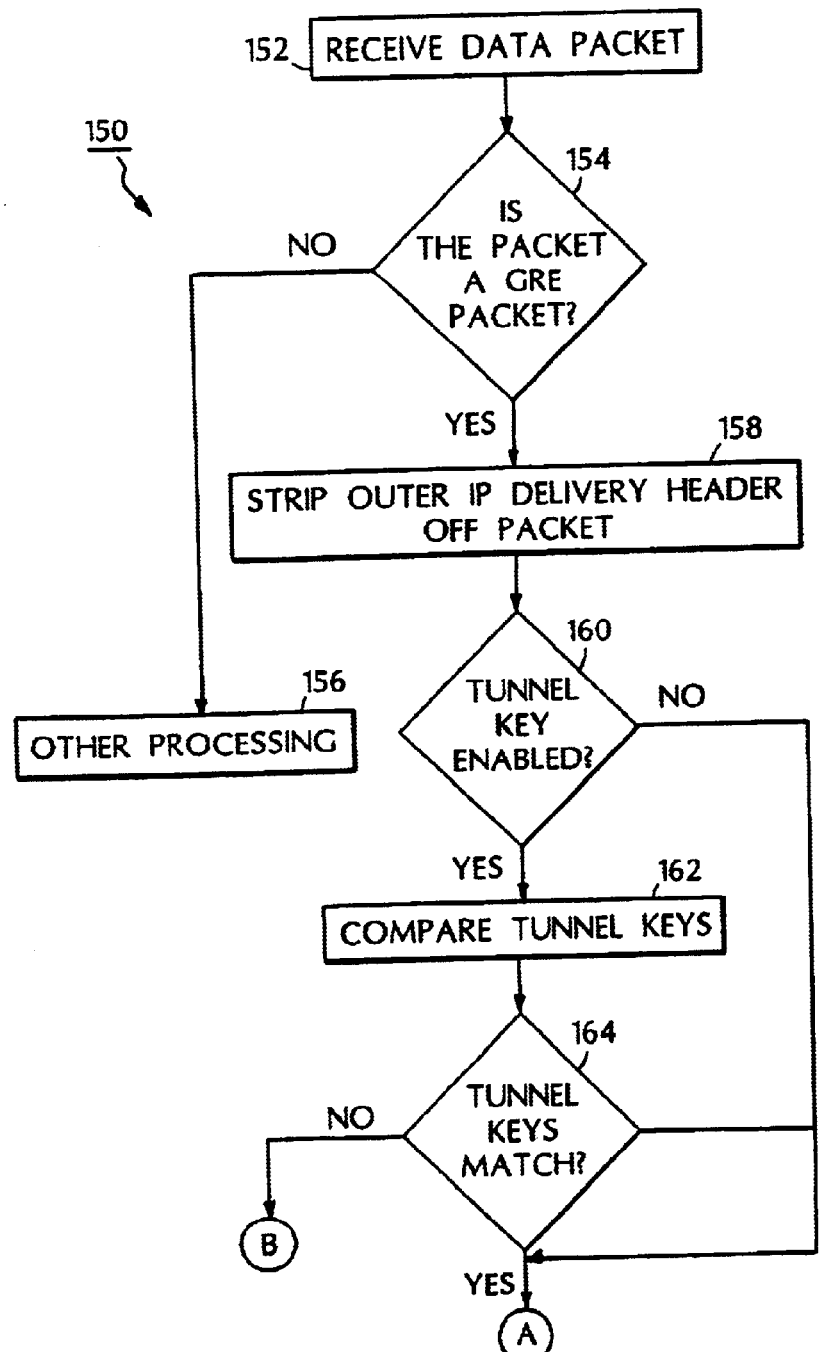
FIG. 12, comprised of FIGS. 12a and 12b, is a flowchart showing a process executed at an end point device to process an encapsulated ARP broadcast packet and to provide a reply to the ARP broadcast packet.
Figure 12B:
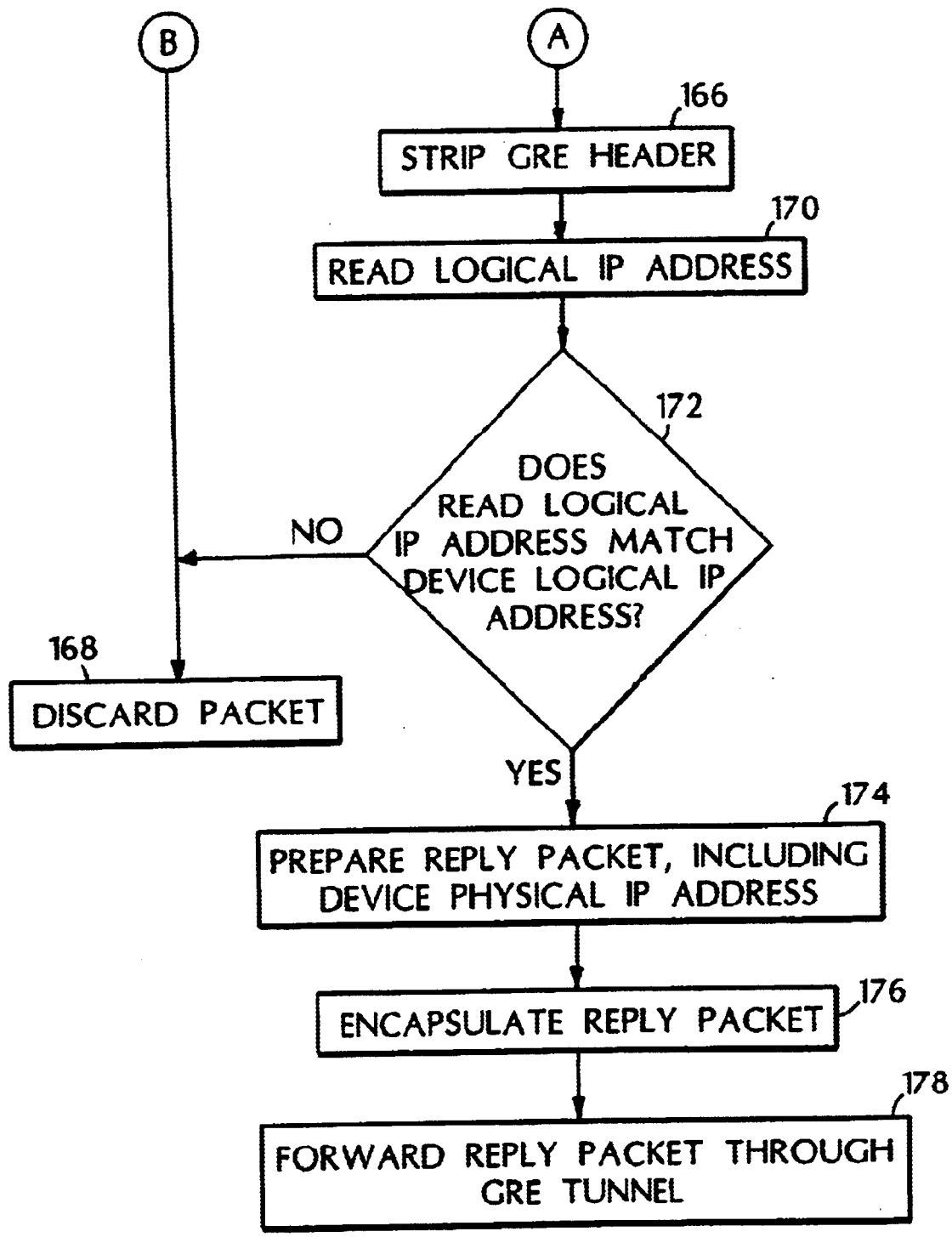

Referring to FIG. 12, a process 150 is shown by which device 14 determines whether to issue a reply to the encapsulated ARP broadcast packet 145 from device 12.

Process 150 receives 152 the encapsulated ARP broadcast packet 145 from device 12 via GRE tunnel 24. Process 150 determines 154, based on the value in the packet's protocol field 144c, whether the data packet is a GRE packet. If the packet is not a GRE packet, device 14 may use it in other processing 156.

If the packet is a GRE packet, device 14 strips 158 the IP delivery header 144 off the packet and reads the physical IP address 144b of device 12. Device 14 also checks 160 (using the key present bit in the GRE header) whether a tunnel key has been enabled. If so, device 14 compares 162 the tunnel key in the data packet to a tunnel key stored in its memory. If the tunnel keys do not match 164, process 150 discards 168 the packet and returns. If the tunnel keys match 164, or if it was determined 160 that the tunnel key was not enabled, process 150 strips 166 the GRE header 142 from the packet and reads 170 the logical IP address 141a from the payload of the ARP broadcast packet. If the logical IP address 141a from the ARP broadcast packet does not match 172 the logical address of device 14, the packet is discarded 168. If the two match, process 150 prepares 174 an ARP reply packet which includes the physical IP (unicast) address of device 14 as its payload.

The ARP reply packet is encapsulated 176 for transmission to device 12 over GRE tunnel 24. The encapsulation process is similar to that described above. However, the physical IP address of device 12 (144b from encapsulated ARP broadcast packet 145) is used as the destination address in the IP delivery header of encapsulated ARP reply packet 147. The encapsulated ARP reply packet 147 is forwarded 178 to device 12 over GRE tunnel 24. Device 12 processes the reply packet as described in FIG. 6 above to read the physical IP address of device 14 therefrom.

Other embodiments are within the scope of the following claims. For example, the invention can be used with protocols and networks other than those described above. In addition, the invention can be used on any type of networkable device, not just PCs and routers.

It is to be understood that while the invention has been described in conjunction with the detailed description thereof, the foregoing description is intended to illustrate and not to limit the scope of the invention. Other aspects, advantages, and modifications are within the scope of the following claims.

What is claimed is:

1. A method of obtaining an end point address of a generic routing encapsulation (GRE) tunnel, the GRE tunnel comprising at least two end point devices that define the GRE tunnel, the method comprising:
    forwarding a data packet through the GRE tunnel to a remote GRE tunnel end point device;
    receiving a reply from the remote GRE tunnel end point device, the reply including a physical address of the remote GRE tunnel end point device; and
    updating a table on the local GRE tunnel end point device to include the physical address of the remote GRE tunnel end point device;
    wherein the reply comprises a GRE-encapsulated data packet.

2. The method of claim 1, wherein the reply includes a unicast address of the remote GRE tunnel end point device.

3. The method of claim 1, wherein the data packet comprises an address resolution protocol (ARP) packet; and
wherein the ARP packet includes a logical address of the remote GRE tunnel end point device.

4. The method of claim 1, wherein the GRE-encapsulated data packet includes the physical address of the remote GRE tunnel end point device as a payload.

5. A computer program stored on a computer-readable medium for obtaining an end point address of a generic routing encapsulation (GRE) tunnel, the GRE tunnel comprising at least two end point devices that define the GRE tunnel, the computer program comprising instructions that cause a computer to:
forward a data packet through the GRE tunnel to a remote GRE tunnel end point device;
receive a reply from the remote GRE tunnel end point device, the reply including a physical address of the remote GRE tunnel end point device; and
update a table on the local GRE tunnel end point device to include the physical address of the remote GRE tunnel end point device;
wherein the reply comprises a GRE-encapsulated data packet.

6. The computer program of claim 5, wherein the reply includes a unicast address of the remote GRE tunnel end point device.

7. The computer program of claim 5, wherein the data packet comprises an address resolution protocol (ARP) packet; and
wherein the ARP packet includes a logical address of the remote GRE tunnel end point device.

8. The computer program of claim 5, wherein the GRE-encapsulated data packet includes the physical address of the remote GRE tunnel end point device as a payload.

9. An apparatus for obtaining an end point address of a generic routing encapsulation (GRE) tunnel, the GRE tunnel comprising at least two end point devices that define the GRE tunnel, the apparatus comprising a processor which executes computer code to:
forward a data packet through the GRE tunnel to a remote GRE tunnel end point device;
receive a reply from the remote GRE tunnel end point device, the reply including a physical address of the remote GRE tunnel end point device;
update the address table to include the physical address of the remote GRE tunnel end point device;
wherein the reply comprises a GRE-encapsulated data packet.

10. The apparatus of claim 9, wherein the reply includes a unicast address of the remote GRE tunnel end point device.

11. The apparatus of claim 9, wherein the data packet comprises an address resolution protocol (ARP) packet; and
wherein the ARP packet includes a logical address of the remote GRE tunnel end point device.

12. The apparatus of claim 9, wherein the GRE-encapsulated data packet includes the physical address of the remote GRE tunnel end point device as a payload.

13. A method, performed by a local GRE tunnel end point device, of obtaining an end point address of a generic routing encapsulation (GRE) tunnel, comprising:
forwarding a data packet through the GRE tunnel to a remote GRE tunnel end point device;
receiving a reply from the remote GRE tunnel end point device, the reply including a physical address of the remote GRE tunnel end point device; and
updating a table on the local GRE tunnel end point device to include the physical address of the remote GRE tunnel end point device.

14. The method of claim 13, wherein the reply includes a unicast address of the remote GRE tunnel end point device.

15. A computer program, stored on a computer-readable medium of a local GRE tunnel end point device, for obtaining an end point address of a generic routing encapsulation (GRE) tunnel, the computer program comprising instructions that cause the local GRE tunnel end point device to:
forward a data packet through the GRE tunnel to a remote GRE tunnel end point device;
receive a reply from the remote GRE tunnel end point device, the reply including a physical address of the remote GRE tunnel end point device; and
update a table on the local GRE tunnel end point device to include the physical address of the remote GRE tunnel end point device.

16. The computer program of claim 15, wherein the reply includes a unicast address of the remote GRE tunnel end point device.

17. An apparatus for obtaining an end point address of a generic routing encapsulation (GRE) tunnel, the apparatus comprising:
a memory which stores an address table; and
a processor which executes computer code to:
forward a data packet through the GRE tunnel to a remote GRE tunnel end point device;
receive a reply from the remote GRE tunnel end point device, the reply including a physical address of the remote GRE tunnel end point device; and
update the address table to include the physical address of the remote GRE tunnel end point device.

18. The apparatus of claim 17, wherein the reply includes a unicast address of the remote GRE tunnel end point device.

* * * * *